US009832098B2

(12) United States Patent
Scheurich et al.

(10) Patent No.: US 9,832,098 B2
(45) Date of Patent: Nov. 28, 2017

(54) CONNECTING A BOOTING SWITCH TO A NETWORK

(71) Applicant: Telefonaktiebolaget L M Ericsson (publ), Stockholm (SE)

(72) Inventors: Jan Scheurich, Aachen (DE); Dirk Kampmann, Vaals (NL); Christoph Meyer, Herzogenrath (DE); Andreas Witzel, Herzogenrath (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 137 days.

(21) Appl. No.: 14/655,874

(22) PCT Filed: Jan. 9, 2013

(86) PCT No.: PCT/EP2013/050273
§ 371 (c)(1),
(2) Date: Jun. 26, 2015

(87) PCT Pub. No.: WO2014/108178
PCT Pub. Date: Jul. 17, 2014

(65) Prior Publication Data
US 2015/0341253 A1    Nov. 26, 2015

(51) Int. Cl.
*H04L 12/751* (2013.01)
*H04L 12/24* (2006.01)
(Continued)

(52) U.S. Cl.
CPC .......... *H04L 45/02* (2013.01); *H04L 41/0806* (2013.01); *H04L 41/0893* (2013.01);
(Continued)

(58) Field of Classification Search
CPC ... H04L 45/02; H04L 61/2038; H04L 67/104; H04W 8/005; H04W 8/26; H04W 8/265; H04W 4/008; H04W 4/203
(Continued)

(56) References Cited

U.S. PATENT DOCUMENTS

2005/0099948 A1* 5/2005 Wakumoto .............. H04L 43/50
                                                                    370/236
2008/0298367 A1* 12/2008 Furukawa ........... H04L 12/4641
                                                                    370/392
(Continued)

FOREIGN PATENT DOCUMENTS

EP    1 976 195 A1    10/2008

OTHER PUBLICATIONS

Alisa et al. (A use-case based analysis of network management functions in the ONF SDN model, dated 2012).*
(Continued)

*Primary Examiner* — Jae Y Lee
*Assistant Examiner* — Jean F Voltaire
(74) *Attorney, Agent, or Firm* — Sage Patent Group

(57) ABSTRACT

A method for connecting, by a central control unit (CCU), a booting switch to a network. The network includes switches controlled by the CCU using control data packets that are transmitted via communications paths in the network. User packets are transmitted through the network using the same communications paths. A switch uses forwarding rules stored in a pipeline to forward packets in the network. A local port in each switch provides access to the pipeline. The paths in the network for the control data packets are established by storing forwarding rules configured by the CCU in the pipelines of the switches. At least one switch contains a connecting port via which the booting switch is connected to the network. The forwarding rules in the booting switch are
(Continued)

stored by the CCU using a temporary path, which contains the existing path and a connecting path.

17 Claims, 8 Drawing Sheets

(51) Int. Cl.
*H04L 12/721* (2013.01)
*H04L 29/12* (2006.01)

(52) U.S. Cl.
CPC .............. *H04L 45/66* (2013.01); *H04L 41/12* (2013.01); *H04L 61/103* (2013.01); *H04L 61/2015* (2013.01)

(58) Field of Classification Search
USPC ........................................................ 370/422
See application file for complete search history.

(56) References Cited

U.S. PATENT DOCUMENTS

2009/0086726 A1* 4/2009 Savage .................... H04L 45/00 370/389
2009/0138577 A1 5/2009 Casado et al.

OTHER PUBLICATIONS

A use-case based analysis of network management functions in the ONF SDN model, dated 2012.*
Devlic A. et al. "A Use-Case Based Analysis of Network Management Functions in the ONF SDN Model", IEEE European Workshop on Software Defined Networking, Oct. 25, 2012, p. 85-90.
International Search Report and Written Opinion Corresponding to International Application No. PCT/EP2013/050273; dated Jun. 20, 2013; 26 Pages.
Open Networking Foundation, OpenFlow Management and Configuration Protocol (OF-Config 1.1), Version 1.1, Jun. 25, 2012, 117 Pages.
Open Networking Foundation, OpenFlow Switch Specification Version 1.3.1, Sep. 6, 2012, retrieved from the internet on Mar. 20, 2013 at URL: https://www.opennetworking.org/images/stories/downloads/specification/openflow-spec-v1.3.1.pdf.
Open Networking Foundation, OpenFlow Switch Specification Version 1.2 (Wire Protocol 0x03), Dec. 5, 2011, 83 Pages.
The Institute of Electrical and Electronics Engineers et al., "IEEE 802.1D Media Access Control (MAC) Bridges", Internet Citation, Jun. 9, 2004, Retrieved from the internet on Aug. 8, 2008 at URL: http://ieeexplore.ieee.org/ie5/9155/29062/01309630.pdf.

* cited by examiner

CONNECTING A BOOTING SWITCH TO A NETWORK

CROSS REFERENCE TO RELATED APPLICATION

This application is a 35 U.S.C. §371 national stage application of PCT International Application No. PCT/EP2013/050273, filed on 9 Jan. 2013, the disclosure and content of which is incorporated by reference herein in its entirety. The above-referenced PCT International Application was published in the English language as International Publication No. WO 2014/108178 A1 on 17 Jul. 2014.

TECHNICAL FIELD

The present invention relates to a method for connecting, by a central control unit, a booting switch to a network managed by the central control unit, and to a central control unit configured to connect the booting switch to the network. The invention furthermore relates to a method for connecting the booting switch to the network containing a plurality of interconnected switches and relates to the booting switch.

RELATED ART

The OpenFlow protocol was proposed as a standardized method to control the forwarding behaviour for a switch by a central control unit, e.g. OpenFlow Switch Specification, Version 1.3.1. The OpenFlow Specification describes an OpenFlow switch (OFS) that performs packet forwarding based on information stored in one to many flow tables and one group table organized in a pipeline. Each flow table contains one to many prioritized OpenFlow rules (OF rules). An OpenFlow rule contains a match specification that has to match a packet in order for the rule to be applied, a rule priority indication, and actions to be executed for this packet in case of a selection, for example, send a packet out on a specific port, modify a specific field in the packet, or continued rule evaluation in another table.

In FIG. 1 a network is shown in which an OpenFlow controller (OFC) 10 populates the tables of the switches 21 to 25 with OpenFlow rules. The OpenFlow controller controls the switches 21 to 25, which are connected to each other. The area of interconnected OpenFlow switches is also called OpenFlow network. The OpenFlow controller can control the OpenFlow switches through in-band control or out-of-band control. In the example of FIG. 1 the switches 21-25 are controlled through in-band control signalling. In-band control means that the control signals, the control data packets use the same communication path as user data packets. This can be seen in FIG. 1 where the user data packets between the external ports $P_{e1}$ on $OFS_1$ and $P_{e4}$ on $OFS_4$ use the same links as control signalling between the OpenFlow controller 10 and $OFS_1$ and the OpenFlow controller 10 and $OFS_4$. The alternative to in-band control is out-of-band control, which is not relevant for this invention and not discussed here.

US 2009/0138577 A1 describes a system and methods for managing a network. Furthermore, EP 2 521 308 A1 is known describing a communication system with which a new switch can be connected to a central control unit.

In the OpenFlow protocol in-band management and bootstrapping with respect to the switches and the OpenFlow controller is not disclosed.

In the forum developing the OpenFlow configuration protocol (Open Networking Foundation (ONF)) the use of a Spanning Tree Protocol (STP) is discussed to establish loop-free Ethernet connectivity between OpenFlow switches before the connection to an OpenFlow configuration point is established. However, this does not solve the issues arising in connection with the signalling between an OpenFlow switch and the central control unit that occurs during a bootstrapping procedure of an OpenFlow switch with in-band control.

At boot time an OpenFlow switch cannot yet be controlled by a central control unit. Therefore, the switch must be in a predetermined initial state agnostic of the topology and the state of the network to which the switch is to be connected. The problem specially arises for in-band control. A preconfiguration of the switch would not solve this problem for all booting switches in any given network. Pre-configuration of all the switches in the network according to the (fixed) topology would solve the problem, but is not desirable because it is inflexible and contradicts auto-configuration. Furthermore, the need for a network- and switch specific preconfiguration would certainly contradict the ambition to autoconfigure a network. In order to establish a control connection with the central control unit, the booting switch needs to discover the central control unit and establish a standard IP communication path to it. US 2009/0138577 A1 does not provide an enabling disclosure how a booting switch should be connected to the network.

Accordingly, a need exists to provide an effective method for connecting a booting switch to a central control unit through a plurality of interconnected switches controlled by said central control unit. A further need exists to start the building of a network with a first switch connecting to the central control unit in order to build up a network to which further switches can be connected.

SUMMARY OF THE INVENTION

This need is met by the features of the independent claims.

According to a first aspect, a method for connecting a booting switch to a network by a central unit is provided wherein the network comprises a plurality of switches controlled by the central control unit using control data packets that are transmitted via the same communications paths in the network that are also used by user data packets transmitted through the network. A switch of the network uses forwarding rules stored in a switch's pipeline to forward data packets in the network and a local port in each switch provides access to the pipeline. At least one of the plurality of switches of the network contains a connecting port via which the booting switch is connected to the network. The method comprises the steps of establishing the communication paths in the network by storing forwarding rules configured by the control unit in the pipelines of the plurality of switches. The forwarding rules in the booting switch are stored by the central control unit using a temporary path, the temporary path containing the existing communication path from the connecting port to the central control unit and a connecting communication path from the connecting port to a local port of the booting switch which provides access to the pipeline of the booting switch. The control connection between the booting switch and the central control unit, which is used by the central control unit to configure the forwarding rules in the booting switch, is established over the temporary communication path.

In the invention the in-band control communication path between each of the plurality of switches and the central control unit can be provided through forwarding rules that the central control unit has programmed into the pipelines of the switches using the same control communication path.

It is possible that the communication path between each of the plurality of switches and the central control unit is a layer 2 connection path between each switch's local port and at least one port of the plurality of switches via which the central control unit is attached to the network. In general, however, the invention is not limited to a layer 2 connection path. In general, the communication path may also be layer 3 communication path.

Furthermore, the network may be an OpenFlow network and the switches are OpenFlow switches, the central control unit being an OpenFlow controller. However, in another embodiment not the OpenFlow protocol, but the FORCES protocol may be used. In general, it can relate to any communication network with a plurality of switches that each transfer data packets and a control unit that controls the plurality of switches. Furthermore, the control unit can transmit flow entry information to each switch and the switch, upon receiving a packet, processes the packet in accordance with the flow entry information. The flow entry information corresponds to the forwarding rules mentioned above. The invention can be applied to any communications system in which a central control unit undertakes centralized management of the forwarding behaviour of the switches it controls.

Furthermore, it is possible that the method comprises the step of calculating new communication paths for the user data packets in the network taking into account a changed topology of the network with the added booting switch. When the booting switch is finally attached to the network, the topology of the network has changed and the communication paths can be recalculated in order to determine the best path in the network for the data packets from a source to destination taking into account the changed topology with the booting switch, which is then a full member of the plurality of switches and of the network when the booting is completed.

It is furthermore possible that the temporary communication path used for establishing the control connection between booting switch and central control unit is substituted by a permanent communication path between the central control unit and the booting switch when the central control unit has stored all forwarding rules in the booting switch required for the permanent communication path to the central control unit and when the forwarding rules in the plurality of switches were updated taking into account the changed topology.

When the forwarding rules in the other switches of the network, the plurality of switches, have been updated, and when the configuration of the permanent communication path between the booting switch and the central control unit is completed, the temporary path via which the booting switch is connected to the network and to the central control entity can be replaced by the permanent communication path between the central control unit and the booting switch.

Furthermore, it is possible that the control connection between the central control unit and the booting switch is not interrupted at any time. The communication path, meaning the physical connection between the new booting switch and the central control unit may change, however, the control connection between the two entities is preferably not interrupted any time until the permanent communication path is completed. The control connection is not interrupted, even though the underlying communication path may change from temporary to permanent.

Furthermore, it is possible that the forwarding rules in the booting switch concerning a data packet transport from the local port of a booting switch to the central control unit may be stored as non-active forwarding rules with corresponding priority parameters set in such a way that the booting switch does not apply the forwarding rules as generated by the central control unit with these set priority parameters. The setting of forwarding rules with non-active priority parameters helps to avoid that the forwarding rules are applied by the booting switch before the booting or bootstrapping procedure is completed.

In another embodiment it is, however, possible that forwarding rules are stored, by the central control unit in the booting switch, which are relevant for detecting a topology of the network by the central control unit with corresponding priority parameters set in such a way that the booting switch does apply the forwarding rules as generated by the central unit with the set priority parameters. When the booting switch is connecting to the network, it is preferable that the central control unit learns the new topology of the modified network.

In one embodiment it is possible that the central control unit amends the non-active priority parameters of the forwarding rules of the booting switch in such a way that the forwarding rules are then applied in a new switch. This can happen when the configuration of the forwarding rules in the booting switch is completed and when the update of the forwarding rules in the other switches of the network, the plurality of switches is completed. In this context, it is possible that the central control unit lowers the priority threshold in the booting switch below the priority parameters set for the inactive forwarding rules in the booting switch. As a consequence, the new forwarding in the booting switch are applied as the formerly inactive forwarding rules now have a priority which is above a priority threshold. The central control unit can configure a priority threshold of the forwarding rules of the switches. The forwarding rules programmed by the central control unit to provide the communication path are initially inactive due to their priority being below the threshold when the configuration of the booting switch is completed.

It is furthermore possible that the layer 2 communication paths for in-band control are provided by an E-LAN service connecting the local ports of the switches and at least one port of the plurality of switches, via which the central control unit is connected to the network. E-LAN is a multipoint to multipoint service defined by the Metro Ethernet Forum. When the E-LAN service is used, the connecting port, via which the booting switch is connected to the plurality of switches can be temporarily configured to be part of the E-LAN. Said at least one port could mean all ports which connect to the central control unit and which are intended to be used for the communication towards the control unit.

In another embodiment layer 2 communication paths for in-band control are provided by an E-Tree service connecting the local ports of the plurality of switches as leaf ports and at least one port or all ports of the plurality of switches, via which the central control unit is connected to the network, as root port, E-Tree being a multipoint service defined by MEF, connecting one or more roots and a set of leaves, but preventing inter-leaf communication. In this embodiment it is then possible to configure the connecting port temporarily as a leaf port of the E-Tree.

This E-Tree may be dynamically set up by the central control unit through the used protocol, e.g. the OpenFlow protocol. The root of the in-band E-Tree (is) are the external port(s) to which the central control unit connects. The leaves of the E-Tree are the local port(s) of the switches. All operational switches can thus communicate with the control unit. In order to bootstrap the booting switch, the external port, to which the booting switch is connected, is temporarily also added to the E-Tree. This can provide the booting switch with the necessary layer 2 communication path to the central control unit.

It is possible that the connecting port of said at least one switch which was configured as a leaf port is removed from the E-Tree and the connecting port may be configured as a port of said at least one switch via which said at least one switch is connected to another of the plurality of switches.

Additionally, it is possible that the address of the booting switch is moved from the connecting port of said at least one switch, via which the booting switch is connected to the network, to the local port of the booting switch. The address can be the layer 2 address of the booting switch.

Furthermore, it is possible that the central control unit removes the layer 2 communication path between the connecting port of said at least one switch, i.e. of the existing network and the local port of the booting switch once it has been verified that the central control unit can communicate with the booting switch through a direct layer 2 communication path between the booting switch's local port and the control unit.

The invention furthermore relates to a central control unit configured to connect the booting switch to the network. The central control unit comprises an operating module configured to establish the communication path in the network by storing forwarding rules computed by the central control unit in the pipelines of the plurality of switches using the communications paths. The operating module is further configured to store the forwarding rules in the booting switch using the temporary path which comprises the existing communication path from the connecting port to the central control unit and the connecting communication path from the connecting port to a local port of the booting switch.

The central control unit, especially the operating module of the central control unit, can work as described in more detail above.

According to another aspect of the invention, a method is provided for connecting the booting switch to the network which contains the plurality of interconnected switches controlled by the central control unit, the control unit using in-band communication in which the control data packets are transmitted by the same communication paths in the network as user data packets. The booting switch uses forwarding rules stored in the switch's pipeline to forward data packets to and from the network and the booting switch furthermore comprises a local port providing access to the pipeline and a learning layer 2 switch module with split horizon with two disjoint port groups. One group contains the local port of the booting switch, the other group contains the external ports of the booting switch via which the booting switch is connected to the network. In one step of the method, data packets are received on one of the booting switch's ports and the booting switch then checks whether a matching forwarding rule can be identified in the pipeline for which priority parameters are set in such a way that the forwarding rules are applied by the booting switch. If such a forwarding rule is present in the pipeline of the booting switch, the received data packets are forwarded in agreement with the forwarding rule. When no matching forwarding rules are detected or their priority parameters are set such that they are not applied by the booting switch, the received data packets are forwarded by the learning layer 2 switch module according to the layer 2 forwarding rules where the data packets are not forwarded to ports belonging to the same group as the port on which the packets were received. The use of the two port groups, commonly referred to as split horizon, ensures that the booting switch, when it receives a data packet for which no forwarding rule exists and which came from the network is only forwarded to the local port so that no switching loops are created in case the booting switch is connected to more than one connecting port on one or more of the plurality of switches in the network. Furthermore, a packet in the opposite direction received on the local port is transmitted to one or more ports connecting the booting switch to the network.

The learning switch module associates layer 2 addresses of the central control unit with a port on the temporary communication path to the central control unit by learning the layer 2 source addresses of received control data packets received on a external port of the booting switch.

In the booting phase when the booting switch's pipeline is not yet completely configured by the central control unit, the booting switch effectively behaves as a learning L2 switch with a split horizon. Together with the one or more links connecting the booting switch to the network, this forms the connecting communication path between the local port of the booting switch and the connecting port on the network, which is one part of the temporary communication path between booting switch and the central control unit, the other part being the existing communication path between the connecting port and the central control unit. With the use of the temporary communication path the control connection between booting switch and central control unit can be established, the permanent communication path between the central control unit and the booting switch can be configured by the central control unit.

The invention furthermore relates to the booting switch which connects to the network. The booting switch comprises a pipeline configured to store forwarding rules used to forward data packets in the network. The switch operating module receives configuration commands from the central control unit and programs the pipeline accordingly. A local port is provided connecting the Switch Operating module with the pipeline. The booting switch further has external ports which are all the other ports of the switch and which is not a local port. The booting switch furthermore comprises the learning switch module with the split horizon with the two different port groups. Furthermore, the pipeline is configured to check the received data packets for whether a matching forwarding rule can be identified in the pipeline for which the priority parameters are set in such a way that the forwarding rules are applied by the booting switch. The pipeline then forwards the received data packets in agreement with the matching forwarding rule if such a forwarding rule is present in the pipeline. When no matching forwarding rules are detected, the pipeline is configured to forward the received data packets to the learning switch module where the one group is identified to which the port where the data packets were received belongs. The learning switch module then forwards the received data packets only to one or more ports of the other group according to the layer 2 forwarding rules. The switch operating module may furthermore terminate the communication path with the central control unit.

The invention furthermore relates to a method which describes the scenario that there is no network yet and that the first switch connects to the central control unit. In this context, the invention relates to a method for connecting a booting switch to the central control unit wherein the booting switch uses forwarding rules stored in a switch's pipeline to forward data packets. The booting switch furthermore comprises a local port connecting a switch operating module of the booting switch to the pipeline. The booting switch furthermore has a learning layer 2 switch module with split horizon with two different port groups, one group containing the local port of the booting switch, the other group containing the external ports of the booting switch via which the booting switch is connected to the central control unit. According to one step of the method, a layer 2 communication path is provided between this switch's local port and all external ports of the booting switch based on the learning layer 2 switch module. This step comprises the step of receiving data packets on one of the booting switch's ports and checking whether a matching forwarding rule for the transport of the data packets can be identified in the pipeline for which a priority parameter is set in such a way that the forwarding rule is applied by the booting switch. If a matching forwarding rule is present in the pipeline, the received data packets are forwarded in agreement with the matching forwarding rule. When no matching forwarding rule is detected, the received data packets are forwarded by the learning switch module. At the learning switch module, the group is identified to which the port belongs, where the data packets were received. The received data packets are then forwarded to one or more ports of the other group. In a further step forwarding rules are configured relevant for a transport of control data packets from the local port to the central control unit as non-active forwarding rules with priority parameters set in such a way that the forwarding rules are not applied with the set priority parameters. When all forwarding rules to forward control data packets between the local port and the central control unit are defined in the pipeline, the threshold is amended in such a way that also the non-active forwarding rules are applied. As mentioned above, this can be achieved by setting a priority threshold to zero or below the used priority parameters.

The invention furthermore relates to a method for configuring, by a central control unit, a first booting switch, the booting switch using forwarding rules stored in a switch's pipeline to forward data packets. The booting switch is connected to the controller through an external layer 2 or layer 3 communication path between at least one of the ports of the booting switch and the central control unit. According to the method a control connection is established between the booting switch and the central control unit via a temporary communication path connecting at least one controller port, i.e. a port of the central control unit to the local port of the booting switch, wherein the temporary communication path uses the external communication path. The central control unit configures the forwarding rules in the booting switch through the control connection for a permanent communication path between the local port of the booting switch and the central control unit in the pipeline of the booting switch. Furthermore, the temporary communication path is substituted by a permanent communication path between the central control unit and the booting switch when the central control unit has stored all forwarding rules in the booting switch required for the permanent communication path to the central control unit.

It should be understood that each of the features mentioned above will be described further below and a detailed description may be used alone irrespective of the context in which it is disclosed. Furthermore, it may be used in connection with any of the other features described in the whole application.

BRIEF DESCRIPTION OF THE DRAWINGS

The invention will be described in further detail below with reference to the accompanying drawings, in which.

DETAILED DESCRIPTION

In the following detailed description, an example is explained how a booting switch can be added to an OpenFlow network and how a first booting switch is connected to a central control unit before other network switches exist. However, it should be understood that the invention is not restricted to OpenFlow, and other protocols such as FORCES might be used. The invention relates to packet networks in which the switches are controlled by a central control unit. It furthermore relates to a telecommunications system containing a plurality of switches and a central control unit controlling the switches. The switches are packet transfer devices.

Figure 1:
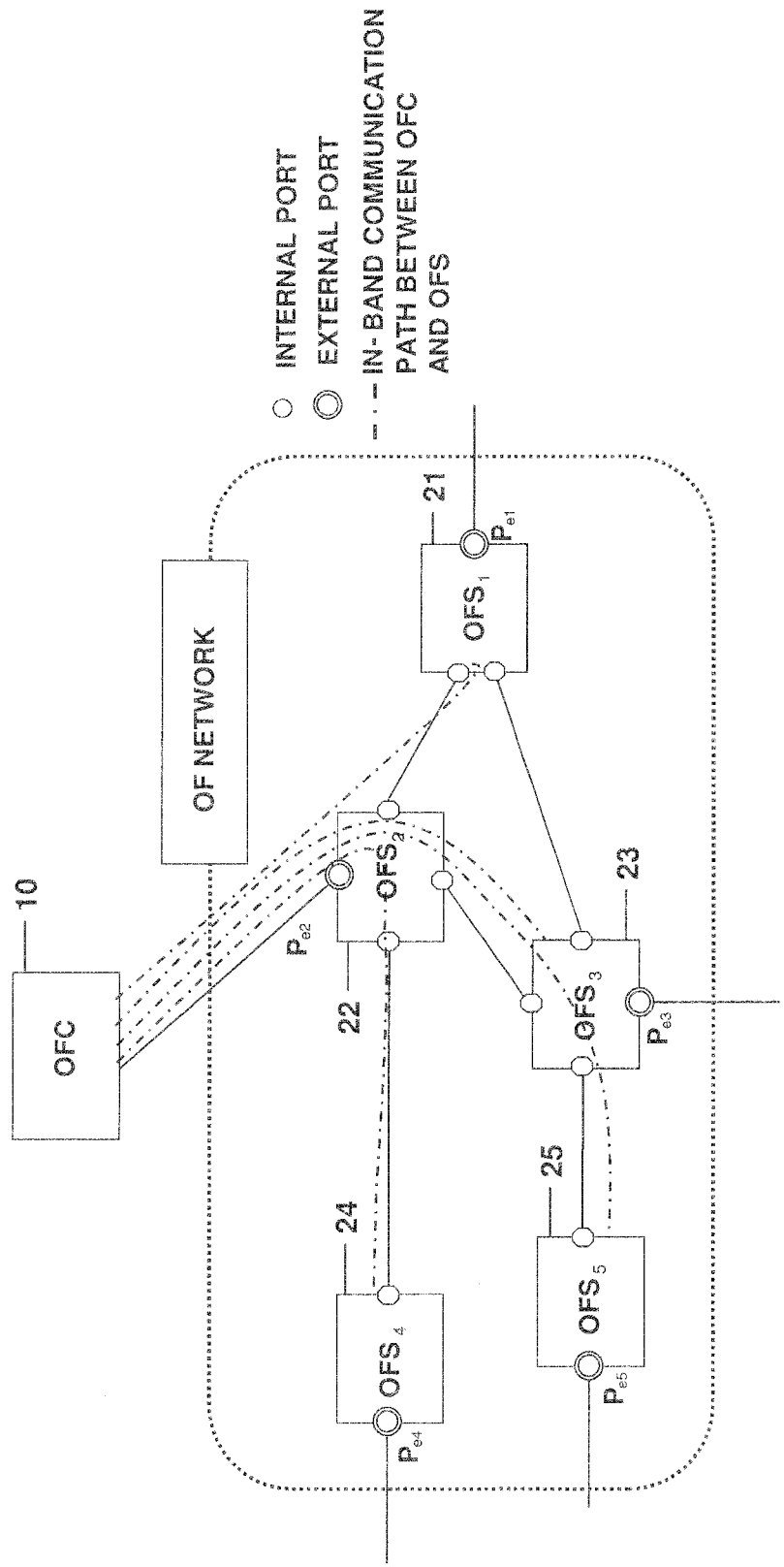
FIG. 1 is a schematic view of an OpenFlow network.
Figure 2:
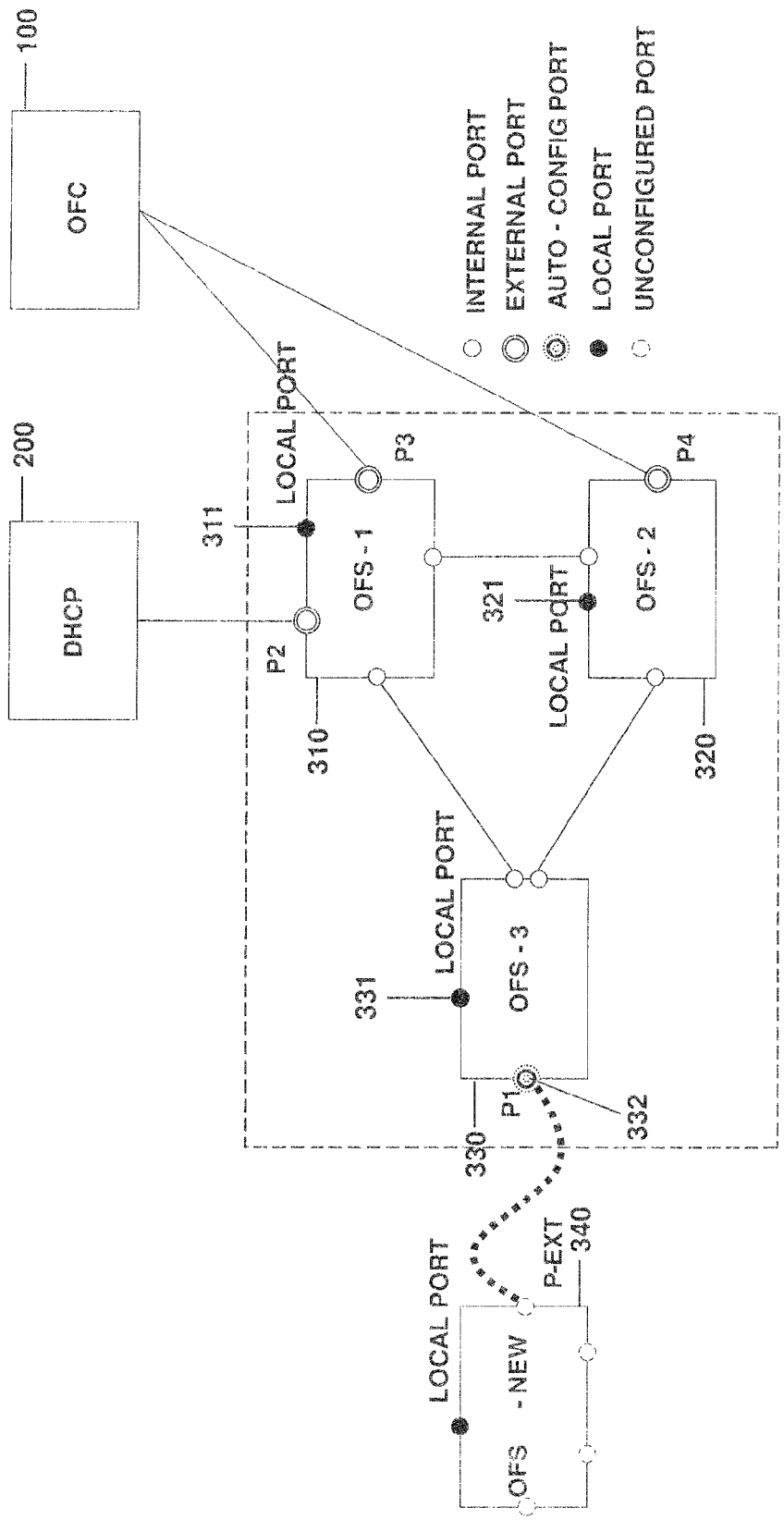
FIG. 2 is a schematic view showing how a booting switch or a new switch connects to an OpenFlow network, according to the invention

The invention provides an integrated solution to OpenFlow bootstrapping that covers the default data plane handling on a booting OpenFlow switch and the transport of the in-band control plane through the remaining network. The bootstrapping procedure can be fully automated, works exclusively with the OpenFlow control plane and does not require any dedicated resources outside the control of the central control unit. In connection with FIG. 2 an OpenFlow network comprising the OpenFlow switches 310-330 is shown. Each of these switches is already fully controlled by the central control unit or OpenFlow controller (OFC) 100. A new switch, the booting switch 340 is to be connected to the existing network. Furthermore, a DHCP (dynamic host configuration protocol) server is provided. DHCP server 200 uses the DHCP protocol that is used to configure elements of the network so they can communicate on an IP network. As shown in FIG. 2, each of the switches has different ports. Switches 310 and 320 are connected to the central control unit 100 via external ports P3 and P4. The ports shown as empty circles are the internal ports via which the different switches are interconnected. An internal port is an active port whose peer node is another switch controlled by the same central control unit. A local port is a port connecting a switch's pipeline to the switch operating module. An external port is any other port of the switch controlled by the central control unit. In FIG. 2 each switch furthermore has a local port symbolized by the fully shaded circles, the local port being the port that connects the switch operating module to the switch pipeline where forwarding rules are stored and executed as will be disclosed in further detail in connection with FIG. 3.

Figure 3:
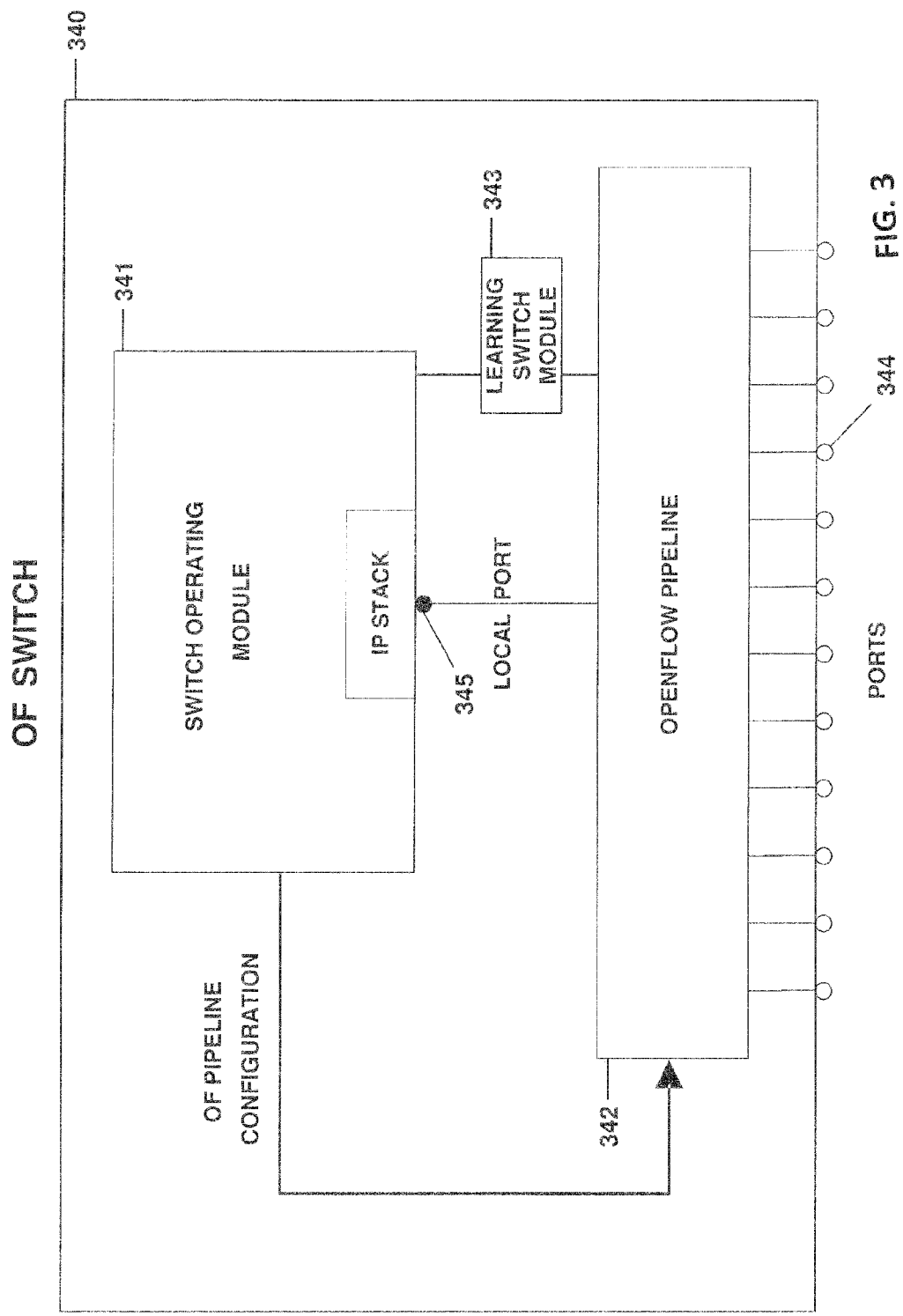
FIG. 3 shows a more detailed example of an OpenFlow switch as used in FIG. 2.

In FIG. 3 an example of a switch such as the booting switch 340 is explained in more detail. It should be understood that the other switches 310-330 may have the same components. Referring to FIG. 3, each switch comprises a switch operating module 341 which can contain hardware and software components to terminate the OpenFlow protocol, support IP protocols (e.g. DHCP), and to configure the OpenFlow Pipeline on behalf of the OFC. Furthermore, the switch comprises an OpenFlow pipeline 342 to store and execute forwarding rules that implements packet forwarding. Furthermore, ports 344 are provided which are used to receive or send traffic. These ports are connected to the OpenFlow pipeline 342. Furthermore, a local port 345 is provided via which the switch operating module transmits and receives in-band control packets through the pipeline 342. Furthermore, an interface is provided to configure the forwarding rules in the OpenFlow pipeline. The learning switch module 343 is used by the switch to learn L2 source the originating layer 2 address of an incoming data packet. As will be explained below, this switch has the ability to find and establish a connection to the central control unit. Furthermore, this switch is able to distinguish between control data packets and user data packets. Furthermore, this switch should be configured to permit in-band communication operations and communications.

Furthermore, this switch is configured to automatically detect the central control unit 100 and can establish a secure channel to the central control unit upon connection to the network. When the switch is booted, the switch may issue a DHCP request from all ports in order to search for the central control unit. The DHCP reply will include an IP address for the switch and the IP address and port numbers on which the central control unit is listening. The switch then can establish a control connection to the central control unit out of the port on which the DHCP was received. In order to establish the connection, the switch has to send an ARP request to find the layer 2 address which serves the central control unit IP address specified in said DHCP reply.

In connection with FIG. 2 the booting procedure of the switch 340 is explained in more detail. First of all, a virtual layer 2 E-Tree network is used for the future in-band communication between the switch and the central control unit. This in-band E-Tree is dynamically set up by the central control unit 100 in the OF network through the OpenFlow protocol. The root of the E-Tree are the external ports to which the central control unit 100 connects and the port(s) the DHCP unit connects. In the example shown, the root ports are port P2, P3 and P4 of FIG. 2. The leaves of the in-band E-Tree are the local ports of the switches, the ports 331, 311 and 321. All operational switches can thus communicate with the central control unit 100. In order to bootstrap the booting switch 340, the external ports to which the booting switch 340 is to be connected are temporarily also added to the in-band E-Tree. This provides the booting switch with the necessary layer 2 communication path to the central control unit 100. In the example shown in FIG. 2 it is a single external port, port 332 (P1) of switch 340, which is the connecting port for the booting switch 340. This connecting port P1 is temporarily configured as leaf of the in-band E-Tree for the purpose of adding this switch. In this state the connecting port is also called the configuration port. The switches, and especially the booting switch 340, is a learning layer 2 switch with split horizon during bootstrapping. Only during bootstrapping, the OF switches make use of the learning layer 2 switch module. Once their configuration is completed the central control unit disables the learning layer 2 switch module so that only the OF pipeline is used for forwarding packets. This means that the switch can forward packets between the external ports of the switch and its local port, but not between external ports. This property helps to avoid the creation of switching loops. During the bootstrapping phase, the booting switch submits packets that do not match any forwarding rule/flow rule in the pipeline 342 to the port serving the layer 2 destination address (if this address is learned by the learning module) or the packet is flooded on all (external) ports, i.e. all ports of the other group of the learning switch. In the reply it will learn the port serving the destination address. The switch operating module can communicate with the central control unit over the link that connects it to the in-band E-Tree port on the neighbouring switch also when the OpenFlow pipeline is not yet programmed.

A further aspect of the invention is that the central control unit can control which forwarding rules become active during the bootstrapping phase. This is beneficial to guarantee that the default bootstrapping data plane handling is not disturbed by forwarding rules before the central control unit has installed the complete set of forwarding rules on the switch. One possibility to introduce this change of the activation of the forwarding rules is the use of a configurable priority threshold parameter which is configurable by the central control unit. The switch will match only rules with a priority above the priority threshold. The central control unit can modify the priority threshold, e.g. through a switch config message. When the priority threshold is set to zero, a commonly known OpenFlow operation of the switch is obtained.

Referring back to FIG. 2, the external ports P2, P3 and P4 are connected to the central control unit and the DHCP unit 200, respectively. These are the root ports of the in-band E-Tree, i.e., they can communicate with all ports of the E-Tree. The local ports 311, 321 and 331 of the switches 310-330 are leafs in the in-band E-Tree which mean that they can only communicate with the above mentioned root ports. The connecting port is also temporarily configured as leaf of the in-band E-Tree. Packets that enter the connecting port from the booting switch 340 can reach all root ports, that means that they can reach the DHCP server 200 and the central control unit 100 and vice versa. external serving this destination other uni-cast of the group of ports according to the split horizon function. The port on which a MAC address is learned becomes the port serving this destination address. The use of the E-Tree is beneficial as it minimizes the number of flow entries needed. However, it should be understood that instead of an E-Tree an E-LAN services might be used. Additionally, it is possible to use E-Lines. In principle, any layer 2 communication path between the external ports and the local port and the port where the booting switch is connected to the network may be used.

The booting switch 340 internally works as a learning layer 2 switch connecting the local port with its ports. For a known destination, MAC addresses, unicast layer 2 packets are sent to the egress port. All other packets are flooded or broadcast to all reachable ports. Furthermore, source MAC addresses are automatically learned at reception of packets on a port.

The booting switch 340 is now connected to the connecting port using the external port on the booting switch. As the OpenFlow pipeline of the booting switch is typically initially empty, packets received will be subject to the default handling of the learning switch module with the split horizon. The local port is on one side of the horizon, the external ports on the other side. Packets are only forwarded between the two port groups. In particular, packets are never forwarded between external ports. This property may be needed avoiding accidental switching loops if the booting switch is connected to several other switches.

The central control unit can also be connected to the OF network through a gateway node/router.

Figure 5:
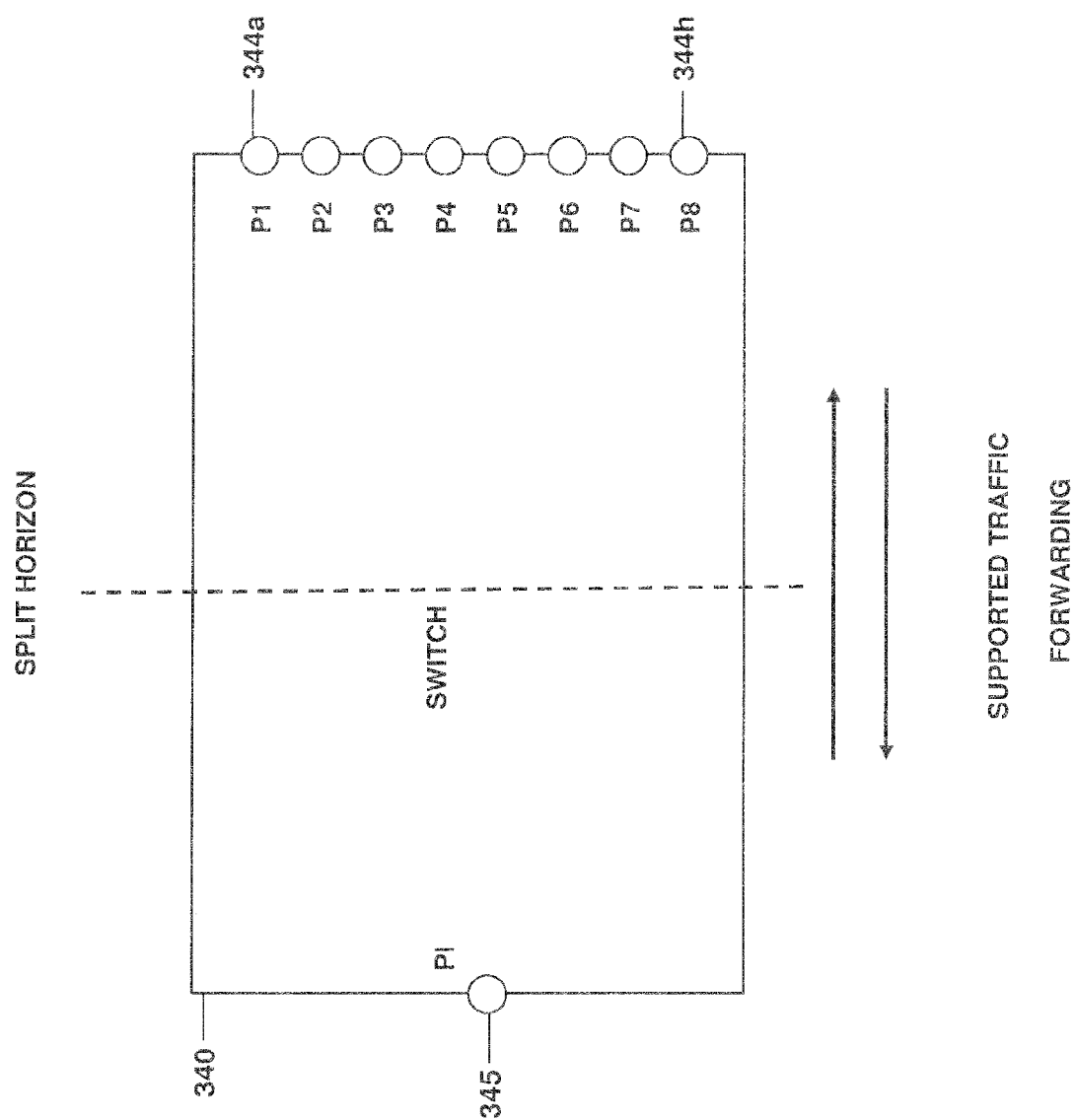
FIG. 5 shows a schematic view of a switch using a split horizon technology.

The split horizon feature is discussed in further detail in FIG. 5. The learning layer 2 switch indicates that the switch forwards traffic on the link layer, which is called layer 2. Furthermore, the switch is a learning switch as it is capable of learning layer 2 addresses. When Ethernet is used as a link layer, the switch is capable of learning and managing MAC addresses.

The split horizon means that the switches comprise two different port groups and switching is only forwarded from ports of one group to ports of the other group. In FIG. 5 this means that traffic forwarding is supported by port 345 to any of ports 344a-h and vice versa in the other direction. The switch, however, does not forward traffic between any pair of ports from 344a-h.

Figure 4:
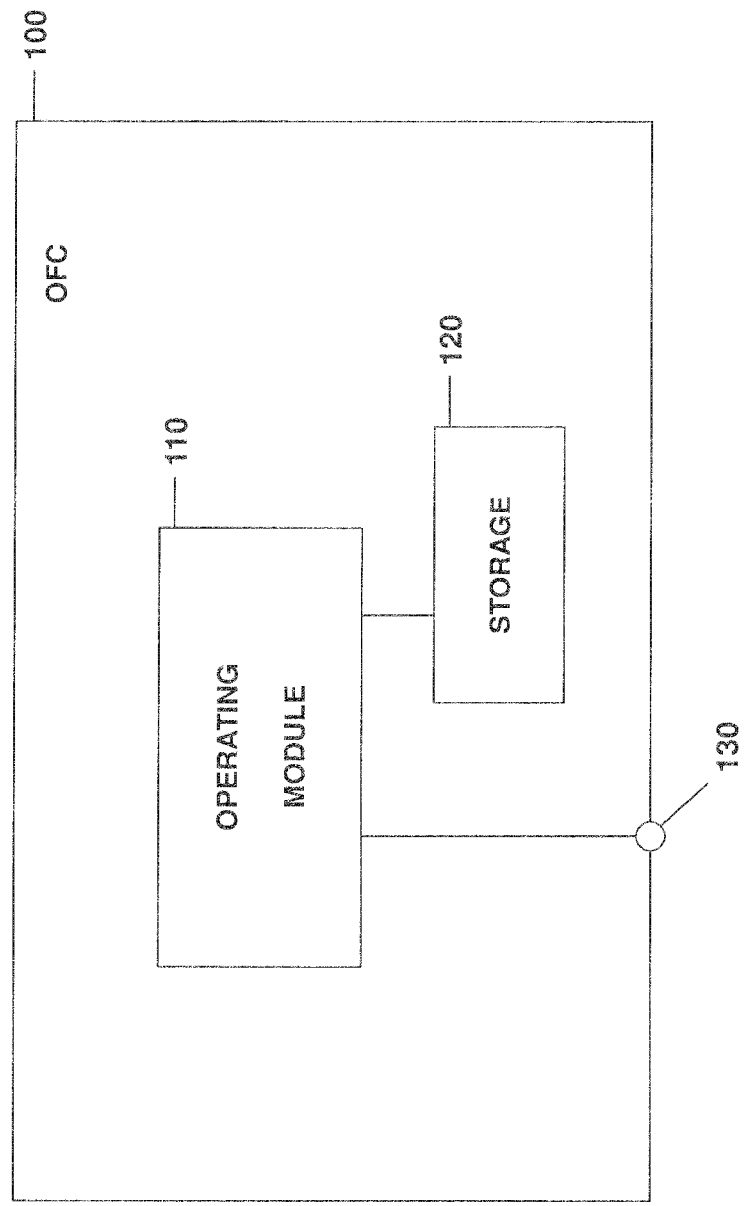
FIG. 4 shows a more detailed schematic view of a central control unit controlling the switches of FIGS. 2 and 3.

With this setup the booting switch 340 is able to use existing protocols and procedures for examples DHCP, ND (V6), to receive its local IP address. Furthermore, DHCP or other procedures such as mDNS (multicast DNS), SSDP (Simple Service Discovery Protocol) can be used to discover the IP address of the central control unit. Thus, the booting switch is able to discover, contact and connect to the central control unit 100. Once the connection is established between the booting switch 340 and the central control unit 100, the central control unit 100 programs the OpenFlow tables in the booting switch with rules having priority parameters set in such a way that a topology detection using, e.g. LLDP frames, is possible. The priorities of these LLDP (Link Layer Discovery Protocol) related rules are above at the priority threshold set in the switch, which means that this rule will override the default learning switch handling. Using standard topology detection procedures, the central control unit 100 identifies the link between the external port on the booting switch $P_{ext}$ and P1 of switch 330. A network information data base provided on a storage unit 120 of the central control unit shown in FIG. 4 is updated with the booting switch 340 and the new link. The central control unit then carries out a shortest path computation to calculate the new transport paths between every pair of switches in the network including the new booting switch and the connecting link.

The central control unit 100 can then install the transport path on the booting switch by programming the OpenFlow pipeline of the booting switch via the Switch Operating Module of said switch. Further, the in-band E-Tree is extended by the local port 345 of the booting switch 340. All these rules are programmed with a priority below the priority threshold of the new switch which means that these rules are not active yet.

In the same way, the central control unit 100 updates all other controlled switches with the said calculated new transport paths, such as switches 310-330 of FIG. 2 by programming the OpenFLow pipelines of said switches. With this the transport paths are installed between said switches and the booting switch, which is now also called the new switch. On the other switches, on the plurality of the switches of the network no priority threshold exists, i.e. the priority threshold is re-set to zero, which means that these rules are applied. However, these rules are not used at this point in time as the MAC address of the booting switch local port is still known to be reachable through a connecting port P1 on switch 330. When all the OpenFlow tables are fully populated, the central control unit 100 switches the booting switch from the bootstrapping data plane handling to full OpenFlow plane handling setting the priority threshold in the booting switch to zero, e.g. with a switch configuration message. The central control unit 100 may also install a number of temporary rules to mimick the split horizon default data plane handling in OpenFlow for a short period after having switched to full OpenFlow processing. This is to allow any packets that might still be received from the connecting port P1 to reach the booting switch stack during the transition. These temporary rules are removed once the OpenFlow based in-band communication is confirmed.

The local port of the booting switch effectively becomes a new leaf port of the in-band E-Tree. The central control unit then moves the local port's MAC address from the connecting port P1 to the local port in order to force all subsequent control packets of the new switch to go directly through the local port. When the transition is completed and the OpenFlow based in-band communication is confirmed, the booting switch has become a full member of the network. The connecting port can be removed from the in-band E-Tree and the port becomes an internal port. Referring to FIG. 2, the temporary path comprises two segments, the connecting path from the local port of switch 340 through the learning switch module and $P_{ext}$ to P1 and, additionally, the path between P1 and P2/P3/P4, i.e. the connecting port and the external ports, e.g. the E-Tree path. The final communication path is the path between the local port of switch 340 and P2/P3/P4, e.g. the E-Tree path.

Furthermore, a safety mechanism can be in place to ensure that the in-band communication path between the switch and the central control unit can be always recovered should it be lost due to errors or temporary failures. By way of example, timers may be started in the switch and the central control unit to supervise that the peer is still reachable. At timer expiry the switch will try to reconnect. After several failed reconnect attempts the switch can fall back to the bootstrapping data plane handling by resetting the priority threshold to its original value.

FIG. 4 shows a schematic view of the central control unit 100. The central control unit 100 contains an operating module 110 which controls the operating of the central control unit as mentioned above in more detail. Furthermore, the storage unit 120 is provided where, inter alia, the network information base of the central control unit may be stored.

Figure 6:
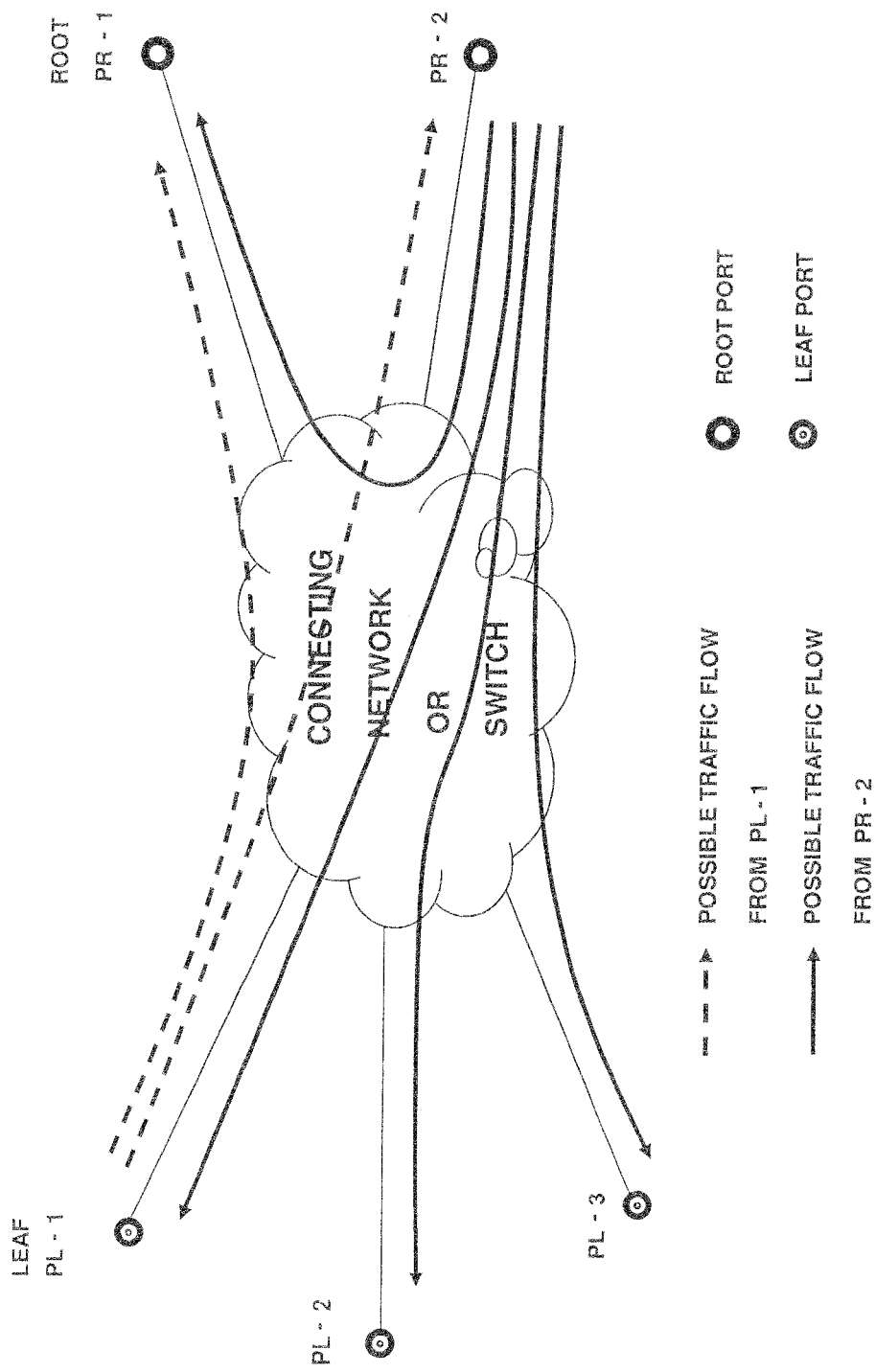
FIG. 6 shows a possible example of an E-Tree configuration.

FIG. 6 is a schematic view of an Ethernet virtual private tree or E-Tree. This E-Tree is a layer 2 service defined by the Metro Ethernet Forum. An E-Tree is a rooted multipoint Ethernet virtual connection comprising two types of ports, the root ports PR-1 and PR-2, wherein a root port can send messages to and receive messages from root ports or leaf ports, and the leaf ports such as ports PL-1 to PL-3, wherein a leaf port can send messages only to and receive messages only to/from a root port. In the Example shown in FIG. 6, the dashed line shows the traffic that can be sent by the leaf port PL-1. The leaf port can send messages only to root port PR-1 and PR-2. By way of example, a broadcast message sent from leaf port PL-1 is delivered to the root ports PR-1 and PR-2. A root port PR-2 can send messages to any other port, a root or leaf port. A broadcast message sent from a root port PR-2 will be delivered at PR-1, PL-1, PL-2 and PL-3.

Figure 7:
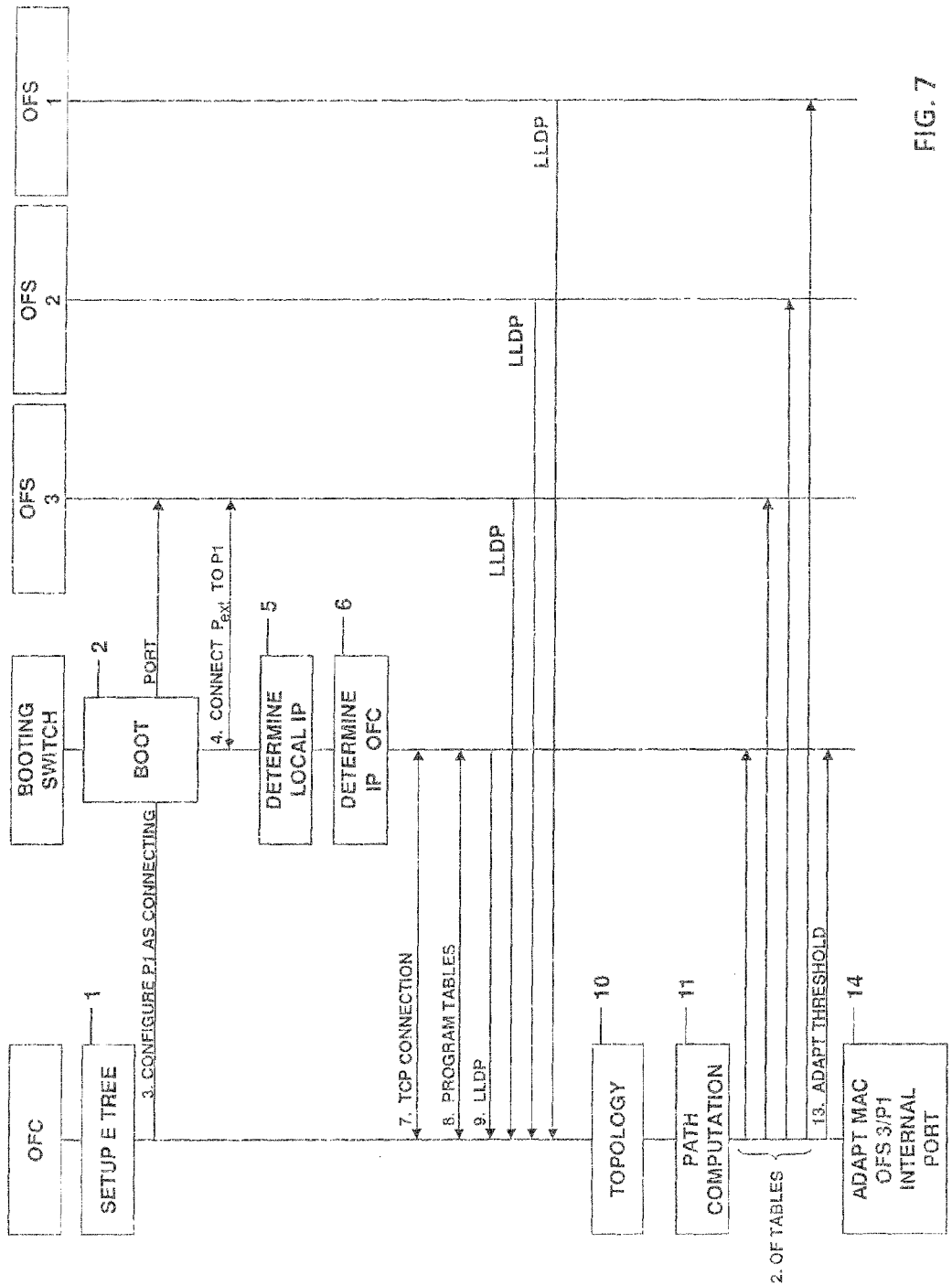
FIG. 7 shows a status diagram and an exchange of messages to connect a booting switch to the network.

FIG. 7 summarizes the data flow for the bootstrapping phase. In step 1 of FIG. 7 the setting up of the E-Tree by the central control unit is symbolized by the shown rectangle (step 1). At the same time, the booting switch is booted (step 2). In step 3 the central control unit can configure P1 as a connecting port and configures this port temporarily as a leaf port of the E-Tree. In step 4 a connecting communication path is built from the connecting port to the local port of the booting switch. During the starting, the booting switch can issue DHCP requests from all ports in order to search for the network address (IP address) of the control unit when P1 is configured as connecting port (leaf of the in-band E-Tree) and the link between $P_{ext}$ and P1 is established. It is not before said step 4 that the switch can receive a DHCP response on one of the ports. The response will include an IP address for the booting switch and the IP address of the central control unit (step 5). In a subsequent step (e.g. ARP resolution) the booting switch identifies its port, that can be used to connect to the central control unit (step 6). It should be understood that steps 1 to 6 need not be performed in the indicated order. They may be performed in parallel by the OFC and the booting switch. In step 7, a TCP connection from the new switch to the central control unit is set up. The OFC programs the booting switch with rules to support topology detection by the booting switch (step 8). Using the established TCP connection, the OFC receives information about the new switch and its ports using the OpenFlow Feature Request/Reply procedure. In step 9 the central control unit discovers new internal links by sending link layer discovery protocol (LLDP) messages from the ports of the booting switch and listening for the reception of these LLDP packets on other switches.

The OFC updates the topology of the network including the booting switch and the discovered links in step 10 including the new physical link to the booting switch. In step 11 the central control unit performs a shortest path computation for the calculation of the new transport paths in the network based on the updated topology. In step 12 the central control unit updates the forwarding rules in all the pipelines of the switches including the booting switch so that the new transport paths can become active. For storing the forwarding rules in the booting switch pipeline, the temporary path containing the existing path from the central control unit 100 to the connecting port P1 is used and the connecting communication path from the connecting port to the local port of the booting switch. The forwarding rules in the booting switch are set with a priority below the priority threshold so that these rules are not applied by the booting switch. When step 12 has been completed in all the switches of the network, the priority threshold in the booting switch is set in such a way that the forwarding rules are applied by the booting switch (step 13). The booting switch is then a fully operating switch. In step 15 the central control unit then moves the local port's MAC address of the booting switch from the connecting port to the local port of the booting switch. Only when the booting switch is a full member a tunnel mechanism for a direct communication between the new switch and the central control unit is used.

Furthermore, it is in general possible that the booting switch is the first switch that connects to the central control unit. In this case the forwarding rules relevant for the transport of control data are configured by the central control unit in the booting switch with the priority set in such a way that these forwarding rules are not yet active. When the layer 2 communication paths between the booting switch's local port and all external ports have been provided and when data packets are received on one of the switch's port, the group is identified, to which the port belongs, where the packet was received and the packet is forwarded to a port of the other group. When all forwarding rules in the booting switch are generated, the threshold is amended that these forwarding rules are applied. There is no connecting port and no in-band E-Tree/E-LAN at this stage. It is only created by the control unit during the bootstrapping of the first switch. In case of E-Tree, the local port of the first switch becomes the first leaf and the ports' connections to the OFC (and DHCP) become the roots. In the E-LAN case, the above ports become members of the in-band E-LAN.

Figure 8:
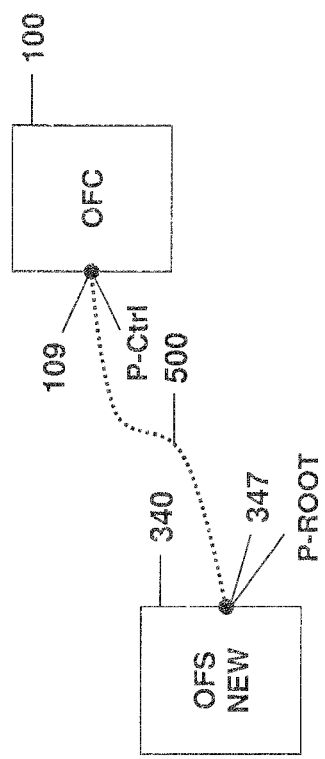
FIG. 8 is a schematic view of a scenario where a central control unit establishes a connection to a booting switch which could be the first member of a network to be built up by a plurality of switches.

This is further explained in connection with FIG. 8. In FIG. 8 a situation is shown where a first booting switch, such as switch 340, connects to a central control unit 100. The booting switch 340 is a first switch of a plurality of other switches following later on so that a network can be established as explained above. The booting switch is connected to the central control unit through an external layer 2 or layer 3 communication path 500 between a port of the booting switch 347 and a controller port 109 of the central control unit 100. The central control unit establishes a control connection to the booting switch using the external communication path 500. Using this control connection, the central control unit programs the forwarding rules in the pipeline of the booting switch in order to generate a permanent communication path between the local port of the booting switch and the central control unit 100. When the programming of the forwarding rules in the booting switch required for the permanent communication path to the central control unit is completed, the temporary communication path is substituted by the permanent communication path.

The above described invention allows the bootstrapping of a network with in-band control without the need for any network or site specific preconfiguration of the switches or a distributed control plane on the switches to manage a dedicated in-band LAN and corresponding reserved data plane resources outside the control of the central control unit. It offers a fully automated integrated procedure that can entirely be controlled by an in-band management application on the central control unit. The E-Tree service used in this solution is of general use for the network and is not limited to the in-band management.

The invention claimed is:

1. A method for connecting, by a central control unit, a booting switch to a network, the network comprising a plurality of switches controlled by the central control unit using control data packets that are transmitted via communications paths in the network, wherein user data packets are transmitted through the network using the same communications paths, wherein a switch uses forwarding rules stored in a switch's pipeline to forward data packets in the network, a local port in each switch providing access to the pipeline, wherein at least one of the plurality of switches contains a connecting port via which the booting switch is connected to the network, the method comprising the steps of:

establishing the communications paths in the network by storing forwarding rules configured by the central control unit in the pipelines of the plurality of switches, wherein the forwarding rules in the booting switch are stored by the central control unit using a temporary path, the temporary path containing the existing communication path from the connecting port to the central control unit and a connecting communication path from the connecting port to a local port of the booting switch which provides access to the pipeline of the booting switch; and wherein the temporary path is substituted by a permanent communication path between the central control unit and the booting switch when the central control unit has stored all forwarding rules in the booting switch required for the permanent communication path to the central control unit and when the forwarding rules in the plurality of switches were updated taking into account a changed topology of the network.

2. The method according to claim 1, wherein the communication path between each of the plurality of switches and the central control unit is a layer 2 connection path between each switch's local port and at least one port of the plurality of switches via which the central control unit is attached to the network.

3. The method according to claim 1, further comprising the step of:
calculating new communication paths for the user data packets in the network taking into account the changed topology of the network with the added booting switch.

4. The method according to claim 1, wherein the forwarding rules in the booting switch concerning a data packet transport from the booting switch's local port to the central control unit are stored as non-active forwarding rules with corresponding priority parameters set in such a way that the booting switch does not apply the forwarding rules as generated by the central control unit with the set priority parameters.

5. The method according to claim 1, wherein the forwarding rules in the booting switch relevant for detecting a topology of the network by the central control unit are stored as active forwarding rules with corresponding priority rules set in such a way that the booting switch does apply the forwarding rules as generated by the central control unit with the set priority parameters.

6. The method according to claim 4, further comprising the step of amending the non-active priority parameters of the forwarding rules of the booting switch in such a way that the forwarding rules are applied in the booting switch when the configuration of the forwarding rules in the booting switch is completed and when the update of the forwarding rules in the plurality of switches is completed.

7. The method according to claim 6, further comprising the step of lowering a priority threshold in the booting switch below the priority parameters set for the inactive forwarding rules in the booting switch, allowing the new forwarding rules in the new switch to be applied.

8. The method according to claim 2, wherein the layer 2 communication path is provided by an E-LAN service connecting the local ports of the switches and at least one port of the plurality of switches via which the central control unit is connected to the network.

9. The method according to claim 2, wherein layer 2 communication paths for in-band control are provided by an E-Tree service connecting the local ports of the plurality of switches as leaf ports and at least one port of the plurality of switches via which the central control unit is connected to the network as root port.

10. The method according to claim 9, wherein the connecting port is temporarily configured as leaf port of the E-Tree.

11. The method according to claim 9, further comprising the step of removing the connecting port of said at least one switch configured as leaf port from the E-Tree and configuring the connecting port as a port of said at least one switch via which said at least one switch is connected to one of the plurality of switches.

12. The method according to claim 1, wherein a control connection between the central control unit and the booting switch is not interrupted at any time.

13. The method according to claim 1, further comprising the step of moving the address of the booting switch from the connecting port of the at least one switch to the local port of the booting switch.

14. A central control unit configured to connect a booting switch to a network, the network comprising a plurality of switches controlled by the central control unit using control data packets that are transmitted via communications paths in the network, wherein user data packets are transmitted through the network using the same communications paths, wherein a switch uses forwarding rules stored in a switch's pipeline to forward data packets to the network, a local port in each switch providing access to the pipeline, wherein at least one of the plurality of switches contains a connecting port via which the booting switch is connected to the network, the central control unit comprising:
an operating module configured to establish the communications paths in the network by storing forwarding rules computed by the central control unit in the pipelines of the plurality of switches using the communications paths, wherein the operating module is further configured to store the forwarding rules in the booting switch using a temporary path, the temporary path comprising of the existing communication path from the connecting port to the central control unit and a connecting communication path from the connecting port to a local port of the booting switch which provides access to the pipeline of the booting switch;
a storing module configured to store the forwarding rules and a changed topology of the network; and
wherein the temporary path is substituted by a permanent communication path between the central control unit and the booting switch when the central control unit has stored all forwarding rules in the booting switch required for the permanent communication path to the central control unit and when the forwarding rules in the plurality of switches were updated taking into account the changed topology of the network.

15. The central control unit according to claim 14, wherein the communication path between each of the plurality of switches and the central control unit is a layer 2 connection path between each switch's local port and at least one port of the plurality of switches via which the central control unit is attached to the network.

16. The central control unit according to claim 14, wherein the forwarding rules in the booting switch concerning a data packet transport from the booting switch's local port to the central control unit are stored as non-active forwarding rules with corresponding priority parameters set in such a way that the booting switch does not apply the forwarding rules as generated by the central control unit with the set priority parameters.

17. The central control unit according to claim 14, wherein the forwarding rules in the booting switch relevant for detecting a topology of the network by the central control unit are stored as active forwarding rules with corresponding priority rules set in such a way that the booting switch does apply the forwarding rules as generated by the central control unit with the set priority parameters.

* * * * *